(12) United States Patent
Fu et al.

(10) Patent No.: US 12,461,133 B2
(45) Date of Patent: Nov. 4, 2025

(54) METHOD FOR TESTING SWITCH SIGNALS OF AN INVERTER OF AN ELECTRIC MACHINE CONTROLLED VIA A PULSE-WIDTH MODULATION

(71) Applicant: Schaeffler Technologies AG & Co. KG, Herzogenaurach (DE)

(72) Inventors: Huan Fu, Rastatt (DE); Vincent Leonhardt, Haguenau (FR); Eduard Enderle, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 203 days.

(21) Appl. No.: 18/274,975

(22) PCT Filed: Jan. 12, 2022

(86) PCT No.: PCT/DE2022/100015
§ 371 (c)(1),
(2) Date: Jul. 28, 2023

(87) PCT Pub. No.: WO2022/161574
PCT Pub. Date: Aug. 4, 2022

(65) Prior Publication Data
US 2024/0142505 A1 May 2, 2024

(30) Foreign Application Priority Data
Feb. 1, 2021 (DE) ............ 10 2021 102 192.8

(51) Int. Cl.
*G01R 23/09* (2006.01)
*G01R 29/02* (2006.01)
(Continued)

(52) U.S. Cl.
CPC ......... *G01R 29/0273* (2013.01); *G01R 23/09* (2013.01); *G01R 29/023* (2013.01);
(Continued)

(58) Field of Classification Search
CPC .. G01R 23/09; G01R 29/023; G01R 29/0273; G01R 31/006; G01R 31/34; H02P 27/085; H02P 29/024; H02P 6/12
See application file for complete search history.

(56) References Cited

U.S. PATENT DOCUMENTS 3,477,002 A    11/1969  Campbell
3,662,247 A *   5/1972  Schieman ............... H02P 27/08
                                                  318/811
(Continued)

FOREIGN PATENT DOCUMENTS

EP        0416111 A1   3/1991
EP        1615331 A1   1/2006
(Continued)

*Primary Examiner* — Vinh P Nguyen
(74) *Attorney, Agent, or Firm* — Suiter Swantz IP

(57) ABSTRACT

A method is provided for testing switch signals of an inverter of an electric machine of a drive system of a motor vehicle. The electric machine is controlled via a pulse-width modulation generated by a control unit using a target duty cycle and a triangular-waveform voltage sequence. An actual duty cycle of a current pulse-width modulation is continuously ascertained from the switch signals and compared with the target duty cycle of the control unit.

20 Claims, 2 Drawing Sheets

(51) Int. Cl.
*G01R 29/027* (2006.01)
*G01R 31/00* (2006.01)
*G01R 31/34* (2020.01)
*H02P 27/08* (2006.01)

(52) U.S. Cl.
CPC .......... *G01R 31/006* (2013.01); *G01R 31/34* (2013.01); *H02P 27/085* (2013.01)

(56) References Cited

U.S. PATENT DOCUMENTS

| | | | | |
|---|---|---|---|---|
| 5,191,504 | A * | 3/1993 | Narisawa | G05B 19/19 361/186 |
| 7,102,322 | B2 * | 9/2006 | Suzuki | H02P 6/10 318/599 |
| 8,488,345 | B2 * | 7/2013 | Tallam | H02M 7/53875 363/37 |
| 10,454,396 | B2 * | 10/2019 | Mori | H02P 27/085 |
| 10,608,569 | B2 * | 3/2020 | Matsumuro | H02P 23/22 |
| 10,938,310 | B1 * | 3/2021 | Cheng | H02M 3/33515 |
| 11,848,633 | B2 * | 12/2023 | Harada | H02P 21/22 |

FOREIGN PATENT DOCUMENTS

| | | | |
|---|---|---|---|
| GB | 2488537 | A | 9/2012 |
| JP | 2018191410 | A | 11/2018 |
| WO | 2020105106 | A1 | 5/2020 |

* cited by examiner

METHOD FOR TESTING SWITCH SIGNALS OF AN INVERTER OF AN ELECTRIC MACHINE CONTROLLED VIA A PULSE-WIDTH MODULATION

CROSS-REFERENCE TO RELATED APPLICATIONS

This application is the U.S. National Phase of PCT Appln. No. PCT/DE2022/100015 filed Jan. 12, 2022, which claims priority to DE 102021102192.8 filed Feb. 1, 2021, the entire disclosures of which are incorporated by reference herein.

TECHNICAL FIELD

The present disclosure relates to a method for testing switch signals of an inverter of an electric machine of a drive system of a motor vehicle, the electric machine being controlled via a pulse-width modulation generated by a control unit using a target duty cycle and a triangular-waveform voltage sequence.

BACKGROUND

Drive systems of motor vehicles with an electric machine can be designed as hybrid or purely electric. The on-board power supply systems with corresponding accumulators for storing and supplying the motor vehicle with electrical energy are designed for DC voltage. In order to be able to control the electric machine via a digitally operating control unit and to supply it with electrical energy, an inverter with power electronics is provided, which is controlled via pulse-width modulation.

The pulse-width modulation provides clocked voltage pulses in square-wave form, each of which has a different length within a clock pulse, and thus operate the electric machine with alternating current depending on the pulse-width of the voltage pulses output by the control unit.

In order to register the output of the drive system, it is necessary to continuously monitor and check the plausibility of the output of the electric machine and thus the alternating currents for its operation. In a known manner, an analog low-pass filter can be provided between the power electronics and the electric machine for this purpose. Due to the close spacing of frequencies between spurious oscillations and the frequency of the pulse-width modulation, such a low-pass filter may be less suitable.

SUMMARY

The present disclosure provides a method for testing switch signals of an inverter for such an electric machine.

The method, according to one exemplary embodiment, is used for testing the switch signals of the inverter which controls and operates the electric machine of a drive system of a motor vehicle via a pulse-width modulation generated by a control unit using a target duty cycle and a triangular-waveform voltage sequence. At least one of these electric machines can form a hybrid drive system in conjunction with an internal combustion engine. Alternatively, a single or multiple such electric machines can form a purely electric drive system. An electric motor operation or generator operation are possible for the electric machine, wherein an internal combustion engine can be started, the motor vehicle can be driven and/or auxiliary units can be driven in the case of electric motor operation. In the case of generator operation, kinetic energy of the motor vehicle can be recuperated and/or an accumulator for electrical and/or kinetic energy can be charged, for example, driven by an internal combustion engine.

In a mode of operation alternative to a low-pass filter and independent of its frequency-limited operation, an actual duty cycle of the pulse-width modulation is continuously ascertained from the switch signals and compared with the target duty cycle of the control unit. Via a comparison between the output duty cycle, the target duty cycle so to speak, and the ascertained actual duty cycle, losses of the switch signals can be determined and, for example, minimized in a controller. This allows a corrected pulse-width modulation to be output to the power electronics by means of appropriately corrected duty cycles, so that the output of the electric machine can be checked for plausibility and adjusted to a desired output in real time.

Advantageously, the actual duty cycle is ascertained in a clock pulse predetermined by the frequency of the triangular-waveform voltage sequence. For example, square-wave pulses of the pulse-width modulation applied to the electric machine can be integrated in a clocked manner and the actual duty cycle can be determined from ascertained pulse-width integrals. Here, for example, the analog integrator can be started, stopped and zeroed after each square-wave pulse by comparing the levels such as high and low values of the pulse-width modulation using an operational amplifier of an operator circuit.

One analog integration value each of the integrator for a single pulse-width is ascertained thereby in a clocked manner. This analog integration value, such as pulse-width integrals of square-wave pulses of the pulse-width modulation ascertained for each clock pulse, can be converted into a digital variable by means of an A/D converter. From this, for example, a digital actual duty cycle can be ascertained for each clock pulse or for a selection of individual clock pulses and read into the control unit.

The respective actual duty cycle of a clock pulse can be ascertained, for example, from the specified frequency of the triangular-waveform voltage sequence and one pulse-width integral each ascertained in this discrete clock pulse.

For example, an actual duty cycle D can be ascertained according to the following equation (1):

$$D = \frac{\int_{t_1}^{t_2} u_{pwm} dt \cdot f_{sw}}{U_1} \quad (1)$$

with the square-wave pulse $u_{pwm}$, the frequency $f_{sw}$ of the triangular-waveform voltage sequence, the DC voltage U1 as well as the start time $t_1$ and the end time $t_2$ of an integration interval.

BRIEF DESCRIPTION OF THE DRAWINGS

The present disclosure is explained in more detail with reference to the exemplary embodiment shown in FIGS. 1 to 5. In the figures.

DETAILED DESCRIPTION

Figure 1:
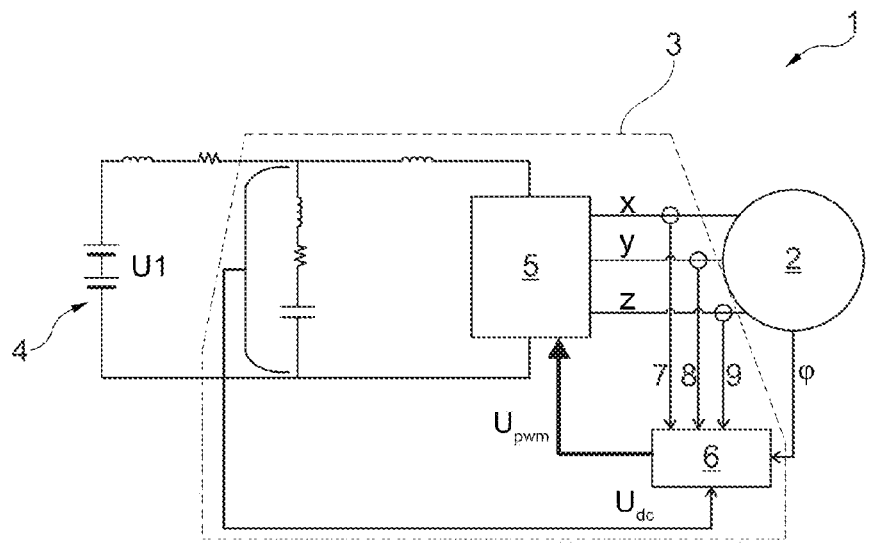
FIG. 1 shows a block diagram of a drive system with an electric machine.

FIG. 1 shows the block diagram of a drive system 1 with an electric machine 2 driven via an inverter 3, which converts DC voltage U1 of an accumulator 4 into an alternating current for electrical energy.

The DC voltage U1 is applied to a power electronics 5 and forms DC voltage $U_{dc}$ for supplying a control unit 6. The control unit 6 controls the electric machine 2 via a pulse-width modulation $u_{pwm}$ and detects an angle of rotation φ of a rotor of the electric machine 2 to determine its rotational characteristics, such as speed, angle of rotation and rotational acceleration.

For testing the plausibility of the pulse-width modulation $u_{pwm}$, switch signals 7, 8, 9, for example currents, voltages or other electrical variables of the three phases x, y, z of the power electronics 5 are detected by the control unit 6 after the power electronics 5 and before the windings of the electric machine 2, respectively, and their pulse-widths are evaluated and compared with the pulse-widths of the pulse-width modulation $u_{pwm}$ output by the control unit 6 to the power electronics 5. If necessary, the pulse-width modulation $u_{pwm}$ is corrected if deviations exceed a threshold, an error message is stored in an error memory or output, and/or a deviation ascertained is reacted to in some other way. The pulse-width modulation output by the power electronics 5 is ascertained in the proposed manner according to the following figures as the actual duty cycle for generating the pulse-width modulation.

Figure 2:
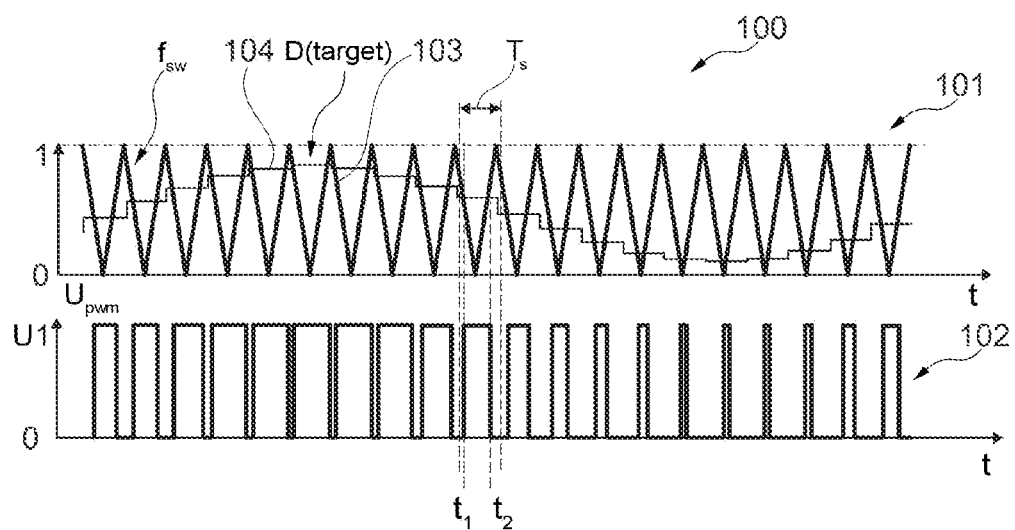
FIG. 2 shows a diagram of the formation of the pulse-width modulation of the control system of FIG. 1.

FIG. 2 shows a diagram 100 with partial diagrams 101, 102 over time t to explain the formation of the pulse-width modulation $u_{pwm}$. The control unit 6—as shown in the partial diagram 101—generates the triangular-waveform voltage sequence shown in curve 103 with the frequency $f_{SW}$ and the resulting wavelength Ts and combines it with the target duty cycle D(target), which is variably provided as a control variable for the control of the electric machine 2 and is shown in the curve 104, with predetermined values between zero and one. This results in the pulse-width modulation $u_{pwm}$ shown in the partial diagram 102, which is combined with the DC voltage U1 of the power electronics 5 and has switch-on times $t_{on}$ of the DC voltage U1 of different lengths determined by the target duty cycle D(target).

Testing of this pulse-width modulation $u_{pwm}$ is performed via detecting the pulse-width integrals actually obtained from the individual switch signals 7, 8, 9. These are calculated from the switch-on time $t_{on}$ of a square-wave pulse and the DC voltage U1. According to the following equations (2) and (3):

$$D = \frac{t_{on}}{Ts} = t_{on} \cdot f_{sw} \tag{2}$$

$$\int_{t_1}^{t_2} u_{pwm} dt = U_1 \cdot t_{on} \tag{3}$$

the actual duty cycle D is ascertained with reference to the aforementioned equation (1) between the respective switch-on times $t_1$ and switch-off times $t_2$ of a wavelength $T_s$ of a respective integration interval of the pulse-width modulation $u_{pwm}$ and compared with the target duty cycle D(target).

Figure 3:
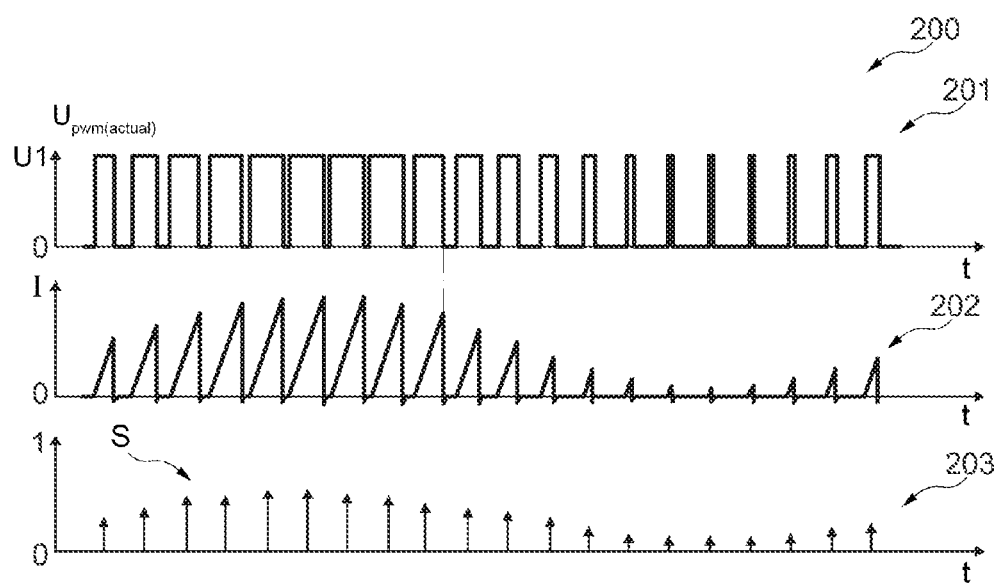
FIG. 3 shows the testing of the actual duty cycle of the control system of FIG. 1.

FIG. 3 shows a diagram 200 with partial diagram 201 of the currently ascertained pulse-width modulation $u_{pwm}$(actual), which alternates between the DC voltage U1 and zero depending on the duty cycle, partial diagram 202 with pulse-width integrals I ascertained in each case from a pulse-width, and partial diagram 203 with digital variables S over time t, which are sampled from the pulse-width integrals I, lie between zero and one and are assigned to the current duty cycle. A pulse-width integral I is ascertained from one square-wave pulse present in each clock pulse. Then the integrator is set to zero and the corresponding square-wave pulse is integrated in the next clock pulse. In this way, a pulse-width integral I is ascertained for each clock pulse of a wavelength of the triangular-waveform voltage sequence, to which a sampled variable S over time t is assigned in each case. An actual duty cycle D for each clock pulse is ascertained from the sampled variables S and compared with the target duty cycle D(target).

Figure 4:
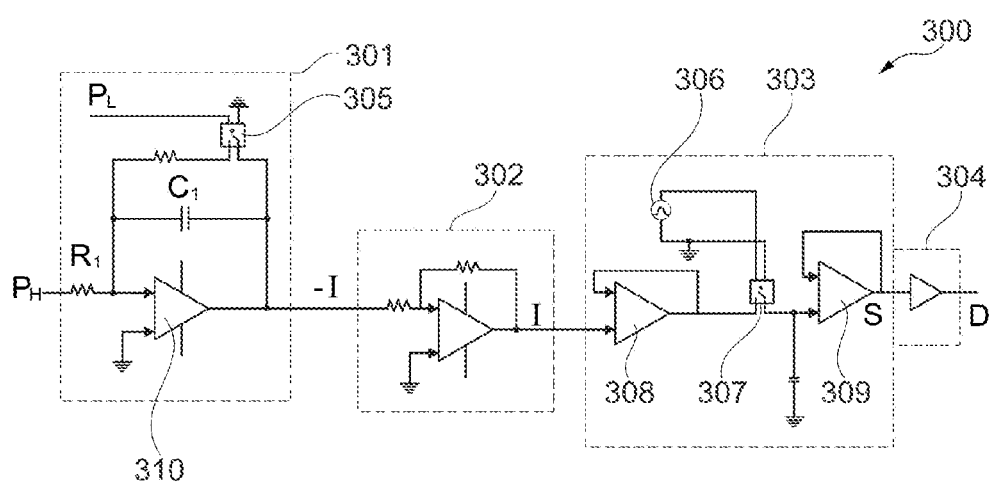
FIG. 4 shows a circuit diagram of a circuit for detecting the actual duty cycle.

FIG. 4 shows a simplified circuit diagram of circuit 300 for testing the pulse-width modulation $u_{pwm}$ of the inverter 3 of FIG. 1. The circuit underlying the circuit diagram 300 can be stored as a hardware or software module in the control unit 6. The circuit shown is formed by the integrator 301, an inverter 302, an A/D converter 303, and an output 304.

Levels $P_H$, $P_L$ of the pulse-width modulation $u_{pwm}$(actual) detected by the control unit 6 are applied to the integrator 301. The level $P_L$ controls a switch 305. A capacitor $C_1$ is discharged in the non-active state of the level $P_L$. When the level $P_L$ is active, the switch 305 is closed and the level $P_L$ corresponding to the DC voltage U1 charges the capacitor $C_1$ through a resistor $R_1$ for the duration of the current pulse-width, so that the charge on the capacitor $C_1$ is equal to the negative pulse-width charge integral transferred from an operational amplifier 310 to the inverter 302.

In the inverter 302, the negative pulse-width integral is inverted so that according to the equation (4):

$$I = \frac{\int_{t_1}^{t_2} u_{pwm}(\text{actual}) dt}{2 \cdot R_1 \cdot C_1} \tag{4}$$

the pulse-width integral I can be determined. This analog pulse-width integral I is converted in the A/D converter 303 for each clock pulse via a clock generator 306, a switch 307 and operational amplifiers 308, 309 into digital variables S, which are converted into the actual duty cycle D in the output 304 for each clock pulse of the triangular-waveform voltage sequence. The actual duty cycle D can be compared with the target duty cycle in the control unit 6. Any necessary corrections to the target duty cycle can be initiated and/or carried out by the control unit 6.

LIST OF REFERENCE SYMBOLS

1 Drive system
2 Electric machine
3 Inverter
4 Accumulator
5 Power electronics
6 Control unit
7 Switch signal
8 Switch signal
9 Switch signal
100 Diagram
101 Partial diagram
102 Partial diagram 103 Curve
104 Curve
200 Diagram
201 Partial diagram
202 Partial diagram
203 Partial diagram
300 Circuit
301 Integrator
302 Inverter
303 A/D converter
304 Output
305 Switch
306 Clock generator
307 Switch
308 Operational amplifier
309 Operational amplifier
310 Operational amplifier
$C_1$ Capacitor
D(target) Target duty cycle
D Actual duty cycle
$f_{SW}$ Frequency
I Pulse-width integral
$P_H$ Level
$P_L$ Level
$R_1$ Resistor
s Digital variable
t Time
$t_1$ Start time
$t_2$ End time
$T_S$ Wavelength
$u_{pwm}$ Pulse-width modulation
$u_{pwm}$(actual) Current pulse-width modulation
$U_{dc}$ DC voltage
U1 DC voltage
x Phase
y Phase
z Phase
φ Angle of rotation

The invention claimed is:

1. A method for testing switch signals of an inverter of an electric machine of a drive system of a motor vehicle, the method comprising:
controlling the electric machine via a pulse-width modulation generated by a control unit using a target duty cycle and a triangular-waveform voltage sequence;
continuously determining an actual duty cycle of the pulse-width modulation from the switch signals of the inverter of the electric machine; and
comparing the actual duty cycle and the target duty cycle to determine one or more corrections to the target duty cycle.

2. The method according to claim 1, wherein the actual duty cycle is ascertained in a clock pulse predetermined by a frequency of the triangular-waveform voltage sequence generated by the control unit.

3. The method according to claim 1, wherein square-wave pulses of the pulse-width modulation applied to the electric machine are integrated in a clocked manner, and the actual duty cycle is determined from ascertained pulse-width integrals obtained from one or more switch signals of the inverter.

4. The method according to claim 3, wherein the ascertainment of the pulse-width integral is provided via an analog integrator and the actual duty cycle is read into the control unit by means of an A/D converter.

5. The method according to claim 4, wherein the integrator is reset to zero after each clock pulse.

6. The method according to claim 4, wherein the analog integrator is started, stopped and zeroed based on levels ($P_L$, $P_H$) of the pulse-width modulation.

7. The method according to claim 4, wherein the respective pulse-width integral is converted into a digital variable in the A/D converter.

8. The method according to claim 7, wherein the actual duty cycle is determined in the control unit from the digital variable as a function of a frequency few of the triangular-waveform voltage sequence and a DC voltage of the inverter.

9. The method according to claim 1, wherein the actual duty cycle is determined from a frequency of the triangular-waveform voltage sequence, and in each case, a pulse-width integral is ascertained in a discrete clock pulse.

10. The method according to claim 9, wherein the actual duty cycle D is determined according to the following relationship:

$$D = \frac{\int_{t_1}^{t_2} u_{pwm} dt \cdot f_{sw}}{U_1}$$

with a square-wave pulse $u_{pwm}$, a frequency $f_{SW}$ of the triangular-waveform voltage sequence, a DC voltage $U_1$ of the inverter as well as a start time ti and an end time $t_2$ of an integration interval, wherein the square-wave pulse $u_{pwm}$ is present in each clock pulse for ascertaining at least one pulse-width integral.

11. A method for controlling an electric machine, comprising:
generating a pulse-width modulation based on a target duty cycle and a triangular-waveform voltage sequence;
determining, by a control unit, an actual pulse-width modulation output from switch signals of an inverter of the electric machine;
determining, by the control unit, an actual duty cycle based on the actual pulse-width modulation; and
then updating, by the control unit, the pulse-width modulation based on a comparison of the actual duty cycle and the target duty cycle.

12. The method according to claim 11, wherein the actual pulse-width modulation is determined based on an electrical variable detected before windings of the electric machine.

13. The method according to claim 11, wherein the actual duty cycle is determined for each clock pulse of a triangular-waveform voltage sequence based on a frequency of the triangular-waveform voltage sequence.

14. The method according to claim 13, further comprising:
determining a pulse-width integral for each clock pulse; and
determining the actual duty cycle for each clock pulse additionally based on the pulse width integrals.

15. The method according to claim 11, further comprising:
determining a pulse-width integral for each clock pulse of a triangular-waveform voltage sequence by integrating the actual pulse-width modulation over time, wherein the actual pulse-width modulation includes square-wave pulses; and
determining the actual duty cycle based on the pulse-width integrals.

16. The method according to claim 15, further comprising:
   providing each pulse-width integral via an analog integrator; and
   converting each pulse-width integral into a respective digital variable via an A/D converter.

17. The method according to claim 16, further comprising resetting the analog integrator to zero after each clock pulse.

18. The method according to claim 16, further comprising determining the actual duty cycle for each clock pulse based on a corresponding digital variable.

19. The method according to claim 16, wherein the actual duty cycle is determined from the digital variables as a function of a frequency of a triangular-waveform voltage sequence and a DC voltage of the inverter.

20. The method according to claim 16, wherein the analog integrator is started, stopped and zeroed based on levels ($P_L$, $P_H$) of the actual pulse-width modulation.

* * * * *